(12) United States Patent
Sareen et al.

(10) Patent No.: US 10,521,944 B2
(45) Date of Patent: Dec. 31, 2019

(54) REPOSITIONING USER PERSPECTIVES IN VIRTUAL REALITY ENVIRONMENTS

(71) Applicant: MICROSOFT TECHNOLOGY LICENSING, LLC, Redmond, WA (US)

(72) Inventors: Chaitanya Dev Sareen, Seattle, WA (US); Jenny Kam, Seattle, WA (US); Brian C. Kramp, Kirkland, WA (US); Jonathan Eric Foster, Kirkland, WA (US); Steven T. Kaneko, Medina, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 43 days.

(21) Appl. No.: 15/801,802

(22) Filed: Nov. 2, 2017

(65) Prior Publication Data
US 2019/0057531 A1 Feb. 21, 2019

Related U.S. Application Data

(60) Provisional application No. 62/546,414, filed on Aug. 16, 2017.

(51) Int. Cl.
*G09G 5/02* (2006.01)
*G06T 11/60* (2006.01)
(Continued)

(52) U.S. Cl.
CPC ............ *G06T 11/60* (2013.01); *A63F 13/211* (2014.09); *A63F 13/212* (2014.09); *A63F 13/25* (2014.09);
(Continued)

(58) Field of Classification Search
CPC ....... G06T 19/006; G06T 19/00; G06F 3/011; G06F 3/012; G02B 27/017
(Continued)

(56) References Cited

U.S. PATENT DOCUMENTS 7,155,680 B2 12/2006 Akazawa et al.
8,171,408 B2 * 5/2012 Dawson ................. A63F 13/12
715/706

(Continued)

OTHER PUBLICATIONS

Cai, H., A Legibility Equation for determining ideal viewing areas in lecture halls, Date 2008, [Retrieved on Feb. 10, 2019], Retrieved from the Internet, <URL: https://deepblue.lib.umich.edu/bitstream/handle/2027.42/58415/hcai_1.pdf?sequence=1> (Year: 2008).*

(Continued)

*Primary Examiner* — Gordon G Liu
(74) *Attorney, Agent, or Firm* — Workman Nydegger (57) ABSTRACT

Optimizations are provided for facilitating optimal viewing positions for viewing virtual objects in VR environments. Initially, user selection of a virtual object being rendered in a VR display is detected. Subsequently, an optimal viewing position is dynamically calculated based on one or more characteristic of the virtual object to be viewed. A predetermined triggering event is also detected, and in response to the predetermined triggering event, a scene which is arranged to display the selected virtual object from the optimal viewing position is rendered in the VR display.

20 Claims, 8 Drawing Sheets

(51) Int. Cl.
*G06F 3/01* (2006.01)
*G06F 3/0346* (2013.01)
*A63F 13/25* (2014.01)
*A63F 13/211* (2014.01)
*A63F 13/5255* (2014.01)
*A63F 13/5258* (2014.01)
*A63F 13/212* (2014.01)

(52) U.S. Cl.
CPC ...... *A63F 13/5255* (2014.09); *A63F 13/5258* (2014.09); *G06F 3/011* (2013.01); *G06F 3/013* (2013.01); *G06F 3/017* (2013.01); *G06F 3/0346* (2013.01)

(58) Field of Classification Search
USPC .......................................................... 345/633
See application file for complete search history.

(56) References Cited

U.S. PATENT DOCUMENTS

| | | | |
|---|---|---|---|
| 8,671,349 B2 | 3/2014 | Hamilton et al. | |
| 8,692,835 B2 | 4/2014 | Hamilton et al. | |
| 9,207,836 B2 | 12/2015 | Dawson et al. | |
| 9,256,346 B2 | 2/2016 | Hamilton et al. | |
| 9,256,347 B2 | 2/2016 | Finn et al. | |
| 9,269,178 B2 | 2/2016 | Piemonte et al. | |
| 2004/0104935 A1 | 6/2004 | Williamson et al. | |
| 2009/0113314 A1 | 4/2009 | Dawson et al. | |
| 2011/0055728 A1 | 3/2011 | Dawson et al. | |
| 2012/0249741 A1* | 10/2012 | Maciocci | G06F 3/011 348/46 |
| 2013/0050258 A1* | 2/2013 | Liu | G02B 27/017 345/633 |
| 2013/0326364 A1 | 12/2013 | Latta et al. | |
| 2014/0368534 A1* | 12/2014 | Salter | G02B 27/017 345/619 |
| 2016/0026242 A1 | 1/2016 | Burns et al. | |
| 2016/0300387 A1 | 10/2016 | Ziman | |

OTHER PUBLICATIONS

Dionne, et al., "Tips and Tricks to Get the Most out of your VirtualReality Experiences in Stingray", http://aucache.autodesk.com/au2016/sessionsFiles/21491/12139/handout_21491_DV21491-DIONNE-AU2016.pdf, Retrieved on: Jul. 28, 2017, pp. 1-37.

"Coordinate systems", https://web.archive.org/web/20170608200246/https:/developer.microsoft.com/en-us/windows/mixed-reality/coordinate_systems, Jun. 6, 2017, 10 pages.

* cited by examiner

REPOSITIONING USER PERSPECTIVES IN VIRTUAL REALITY ENVIRONMENTS

CROSS-REFERENCE TO RELATED APPLICATIONS

This application claims the benefit of and priority to U.S. Provisional Patent Application Ser. No. 62/546,414 filed on Aug. 16, 2017 and entitled "REPOSITIONING USER PERSPECTIVES IN VIRTUAL REALITY ENVIRONMENTS," and which application is expressly incorporated herein by reference in its entirety.

BACKGROUND

Mixed-reality computer systems, including virtual-reality systems and augmented-reality systems, have recently received significant interest for their ability to create immersive experiences for users. Conventional virtual reality ("VR" hereafter) systems create an immersive experience such that a user's entire view is obstructed by a virtual world. VR systems are distinguished from conventional augmented-reality systems that merely augment a real-world view, by overlaying a hologram image in the field of view of the real-world view, for example. Unless specifically stated or unless specifically required, as understood by one of skill in the art, the descriptions herein apply to VR systems or equivalent systems.

VR systems often use one or more on-body devices (e.g., a head-mounted device, a handheld device, etc.), typically including a head-mounted display ("HMD" hereafter). The HMD enables a user to view virtual objects and/or environments. By way of an example, a VR system may display a virtual representation of a scenic vista on a HMD with which the user may interact (e.g., walk around in the VR environment).

VR environments often include virtual representations of VR applications or objects, collectively referred to as VR objects, which are intended to be viewed and/or interacted with by users immersed in the VR environment (e.g., a virtual representation of a computer screen or work of art). In some instances, the VR objects are best experienced from a certain perspective or position (e.g., location, distance, orientation, altitude, etc.) the with respect to the VR objects.

To facilitate optimized interaction with VR objects, users may be required to adjust their position with respect to the VR object to an optimal viewing position with precise movements. Such movements may include virtual walking, physical walking which is tracked and represented in the VR environment, and/or VR teleportation.

In some systems, VR teleportation is enabled and can be effectuated for a user when a user selects a new location in the VR environment to be repositioned. For instance, some systems are configured with input devices that enable a user to cast a virtual ray towards a location where the user wants to be repositioned in the VR environment. When the user selects a location to be repositioned, they are effectively teleported to that location in the VR environment and the VR scenes are regenerated to reflect the user's perspective from that new location. In some instances, the ray that is used to select a new location is directed at an object that the user wants to be positioned next to.

Some VR environments hardcode a set of predetermined viewing positions for the selected objects or other POIs (points of interest) that are identified with the virtual ray. These predetermined viewing positions control where a user will be teleported to when the user selects a POI or other object in the virtual environment, with or without use of the virtual ray. Unfortunately, use of predetermined viewing positions prevents users from being repositioned at optimal/customizable viewing positions for the objects and/or POI that they select in the VR environments. Furthermore, excessive use of fixed teleport locations communicates to users a limited, closed environment which is not intuitive or comfortable for many users. Accordingly, there exists a need to improve systems and methods for providing users with customizable and optimal viewing positions in a VR environment.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments are directed to systems, hardware storage devices, and methods for repositioning user perspectives in a VR environment and include, in some embodiments, providing optimal viewing positions for selected virtual objects in VR environments.

In some embodiments, user selection of a virtual object being rendered in a VR display device (e.g., HMD—Head Mounted Display) is detected. Subsequently, an optimal viewing position is dynamically calculated based on one or more characteristic of the virtual object to be viewed. A predetermined triggering event is also detected, and in response to the predetermined triggering event, a scene which is arranged to display the selected virtual object from the optimal viewing position is rendered in the HMD.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Disclosed embodiments are directed to systems, hardware storage devices, and methods for repositioning user perspectives in a VR environment and include, in some instances, providing optimal viewing positions for selected virtual objects in VR environments.

The embodiments may be utilized, in some instances, to overcome some of the limitations inherent in using a fixed set of viewing positions for selected POIs and/or other objects in VR environments. In some disclosed embodiments, optimal viewing positions are dynamically determined based on the context of the virtual content to be viewed. Furthermore, disclosed embodiments allow VR environments to maintain an open, exploration-based atmosphere while still providing users with optimal viewing positions.

Some embodiments utilize or include a wearable display of a computer system, which may be a HMD. A computer system detects a user's selection of a virtual object or VR application being rendered in the HMD. For instance, in some embodiments, a user selects a virtual object by casting a ray which comes in contact with the virtual object. The computing system also identifies an optimal viewing position from which the selected virtual object may be viewed. In some embodiments, the optimal viewing position is dynamically calculated based on characteristics of the virtual object (e.g., width, height, and/or motion). The computing system also detects a predetermined triggering event (e.g., activation of a user control). In response to detecting the predetermined triggering event, the computing system renders an optimized scene in the HMD which displays the selected virtual object from the viewpoint of the optimal viewing position. In some instances, the optimal viewing position is also determined based on metadata, artificial intelligence, and/or machine learning. For example, data may include alterations in viewing position made by users after the rendering of the optimized scene in the HMD, and, in some instances, the computing system modifies the optimal viewing position based on these alterations in viewing position.

Figure 1:
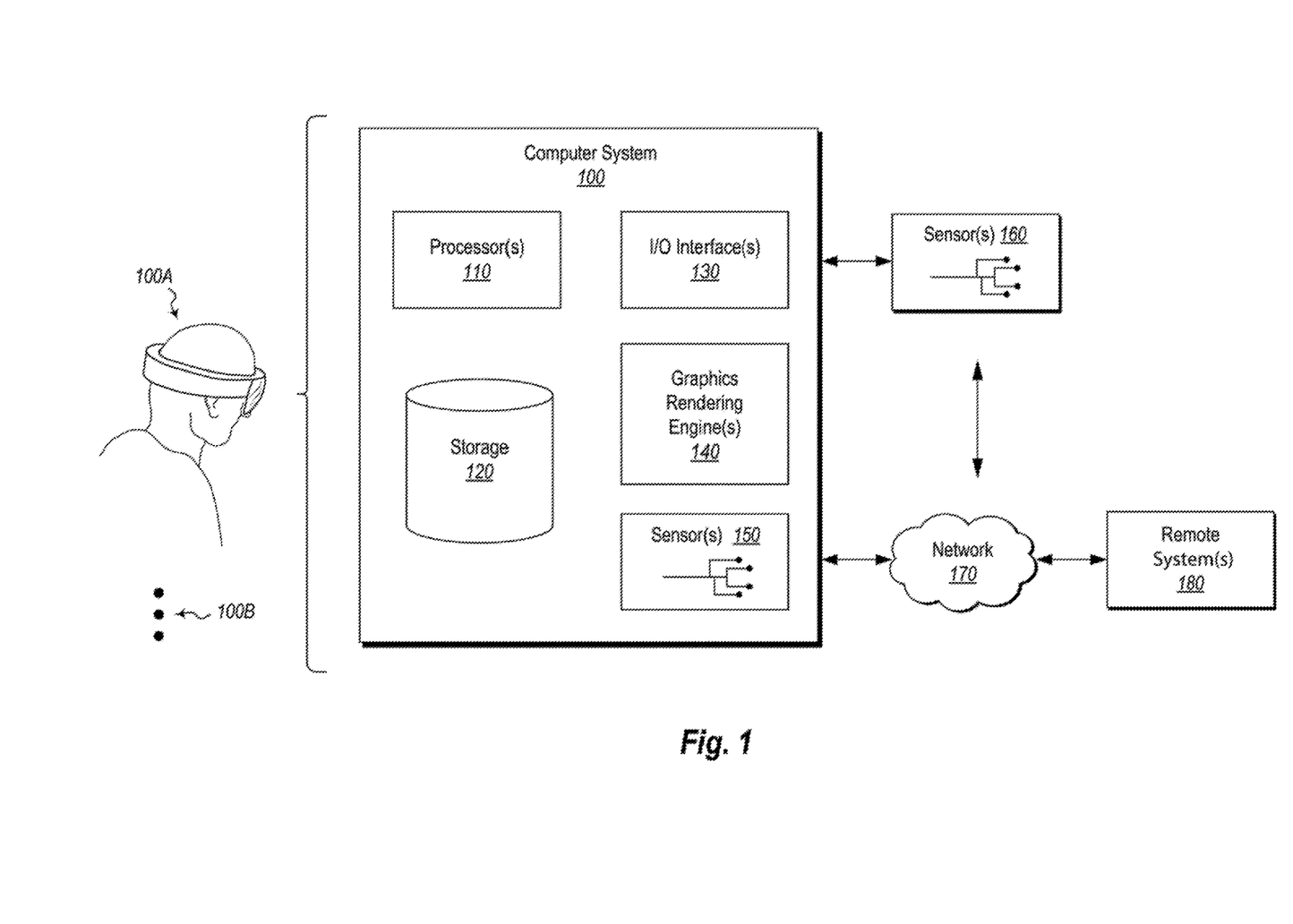
FIG. 1 illustrates an exemplary and non-limiting embodiment of a computer system.

Having just described some of the various benefits and high-level attributes of the disclosed embodiments, additional detailed disclosure will be provided with reference to FIG. 1, which presents an introductory discussion of an exemplary computing system that can be used to implement aspects of the disclosed embodiments. Following the discussion of FIG. 1, various architectures and supporting illustrations will be discussed using FIGS. 2-7 to further illustrate a computing system may dynamically determine an optimal viewing position of a virtual object based on characteristics of the virtual object. Lastly, a flow diagram will be detailed with respect to the remaining figure (FIG. 8), to describe corresponding methods for implementing the disclosed embodiments for providing an optimal viewing position for optimally viewing a virtual object in a VR environment.

Exemplary Computing Systems

As illustrated in FIG. 1, an exemplary computer system 100 may take various different forms. For example, in FIG. 1, the computer system 100 is depicted as a wearable head unit 100A. Although the computer system 100 is depicted as a wearable head unit 100A, the ellipses 100B illustrates that the computer system 100 may be embodied in any form and is not limited strictly to the depiction illustrated in FIG. 1. By way of example, the computer system 100 may take the form of a desktop computer, a laptop, a tablet, a mobile phone, or any other computing device.

In its most basic configuration, the computer system 100 includes at least one hardware processing unit 110 and storage 120. The storage 120 may be physical system memory, which may be volatile, non-volatile, or some combination of the two. The term "memory" may also be used herein to refer to non-volatile mass storage such as physical storage media. If the computer system 100 is distributed, the processing, memory, and/or storage capability may be distributed as well. As used herein, the term "executable module," "executable component," or even "component" can refer to software objects, routines, or methods that may be executed on the computer system 100. The different components, modules, engines, and services described herein may be implemented as objects or processors that execute on the computer system 100 (e.g. as separate threads).

The disclosed embodiments may comprise or utilize a special-purpose or general-purpose computer including computer hardware, such as, for example, one or more processors (such as processor 110) and system memory (such as storage 120), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

As shown in FIG. 1, the computer system 100 comprises various different components, including input/output ("I/O") interface(s) 130, graphics rendering engine(s) 140, and one or more sensors 150. The computer system 100 may also be connected (via a wired or wireless connection) to external sensors 160 (e.g., one or more remote cameras, accelerometers, gyroscopes, acoustic sensors, magnetometers, altimeters, etc.). Further, the computer system 100 may also be connected through one or more wired or wireless networks 170 to one or more remote systems 180 that are configured to perform any of the processing described with regard to computer system 100. The computer system 100 may also access computer-executable instructions, data, data structures, etc. stored on the remote system(s) 180 through the wired or wireless network(s) 170.

During use, a user of the computer system 100 is able to perceive information (e.g., a VR scene) through a display screen that is included within the I/O interface(s) 130, and which is visible to the user. The display screen may be implemented as a HMD. The I/O interface(s) 130 and sensors 150/160 also include gesture detection devices, eye trackers, and/or other movement detecting components (e.g., cameras, gyroscopes, accelerometers, magnetometers, acoustic sensors, global positioning systems ("GPS"), etc.) that are able to detect positioning and movement (e.g., relative or actual) of one or more real-world objects, such as a wall, a user's hand, a stylus, and/or any other object(s) that the user is near or may interact with while being immersed in a VR scene.

In some instances, the positioning and movement of the user and the objects (both virtual and actual) are continuously monitored (or, alternatively, periodically monitored at a predetermined interval and/or in response to a detected event (e.g., movement of the HMD)). This monitoring specifically detects any variation in the position and the movement of the objects, such as a detected change in position, velocity, orientation, or acceleration. These movements can be absolute movements and/or relative movements, such as compared to a relative positioning of the HMD, and such that movements/positioning of the HMD will be calculated into the relative movements/positioning of the objects as they are presented in the scene.

The graphics rendering engine 140 is configured, with the processor(s) 110, to render one or more virtual objects within the scene. The rendered object(s) can be a coarse rendering (e.g., low resolution and/or without texturing, for example), or a rich rendering (e.g., high resolution and/or with texturing). In some embodiments, this rendering includes virtual representations of real-world physical objects that are mapped to the relative positions of the real-world objects. As a result, the virtual objects accurately move in response to movement of the real-world objects, as well as movement of the computer system 100. The graphics rendering engine 140 is also configured to render one or more virtual objects that are purely virtual (without being mapped to real-world objects). The graphics rendering engine 140 is further capable of rendering graphical media in response to user or other commands (e.g., a ray for selecting a virtual object).

The graphics rendering engine(s) 140, which may include one or more GPUs, may be configured to render the virtual objects with certain display properties. These properties include coloring, transparency or opaqueness, texturing, edge definition (e.g., thickness and/or sharpness vs. blurring and/or feathering), size, and so forth. In some embodiments, when certain position (e.g., distance, orientation, velocity and/or other position/movement) thresholds are detected for the real-world object(s), one or more combinations of the display properties for the virtual representation of the object(s) will be modified (at least while the detected positioning, orientation, velocity and/or position/movement meets or exceeds the thresholds).

A "network," like the network 170 shown in FIG. 1, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. The computer system 100 will include one or more communication channels that are used to communicate with the network 170. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

As discussed above, computer systems are able to provide a broad variety of different functions. One such function includes facilitating a transition of a user point of view to an optimal viewing position for a virtual object in a VR environment. FIGS. 2-7 demonstrate this functionality with illustrations of exemplary implementations and embodiments.

Selecting a Virtual Object—Virtual Ray Casting

Figure 2:
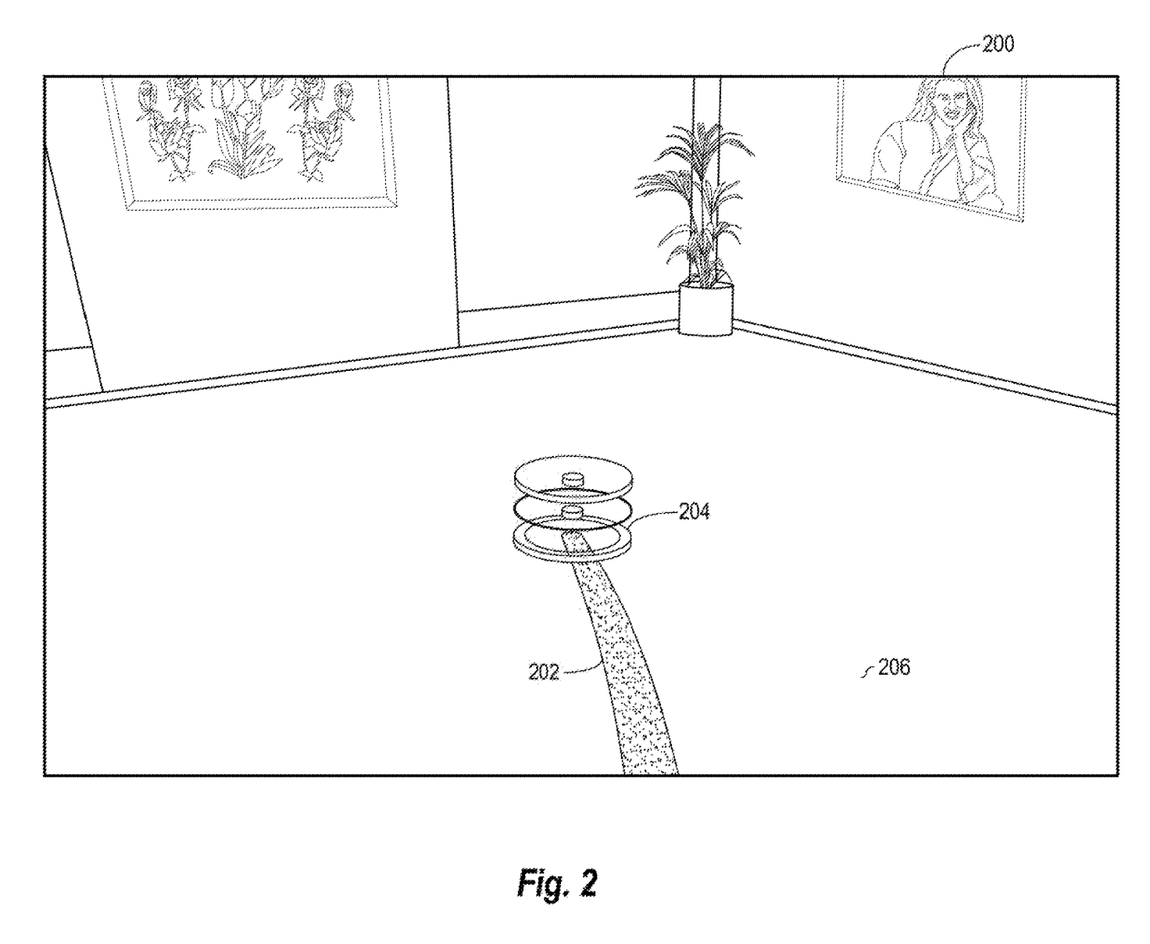
FIG. 2 illustrates an exemplary ray casting virtual object selection system in a VR environment.

When a user is immersed in a VR environment, various mechanisms may be utilized to allow the user to select an object or VR application of interest, such as an object or VR application that the user desires to view from an optimal viewing position. In some of the disclosed embodiments, a user casts and/or manipulates a ray to select a virtual object or VR application for viewing from an optimal viewing position. FIG. 2 illustrates a scene 200 rendered in a HMD, which includes an exemplary ray 202 with selection location 204 casted by a HMD user.

The illustrated ray 202 is not directed towards any particular object of interest (e.g., towards the virtual floor 206), but the direction of the ray 202 may be manipulated by the user to be directed towards an object of interest. For example, in some embodiments, a user may manipulate the direction of a ray 202 with a user-operated control (e.g., a physical dial, button, joystick, and/or a control within an application run on the computer system 100) to direct the ray 202 towards a virtual object of interest. The user-operated control may also include gestures and/or sounds detected by sensor(s) 150 and/or sensor(s) 160 (e.g., eye movement/focus, hand gestures, vocal cues).

Some disclosed embodiments include a configuration in which the ray 202 has a predetermined curvature when cast by the user. The curvature often limits the range of the selection location 204 of the ray 202, or the distance from the user wherein virtual objects are selectable. The disclosed embodiments include implementations where the curvature of the ray 202 will be adjusted, dynamically, based on a detected ray modification input. The ray modification input may include user operation of a dial button (e.g., a button continuously activated or held down), user gestures (e.g., eye movement/focus or hand movements), expiration of time with the ray 202 pointed in a certain direction, and/or other indicative inputs. For example, in some instances, a user casts a selection ray 202 in the direction of an object of interest in a VR environment, but a predetermined curvature of the ray 202 prevents the selection location 204 from reaching the object of interest; the computer system 100 will detect a ray modification input and, in response, adjust the curvature of the ray 202 so as to increase the range of the ray 202 (and the selection location) towards the virtual object of interest.

Some disclosed embodiments include a ray cast object selection mechanism that also gives the user the option to transition their virtual position to the location selected by the casted ray (e.g., VR teleportation), even where the ray does not select an object of interest (e.g., where a ray is pointed to a virtual floor or blank wall).

Figure 3:
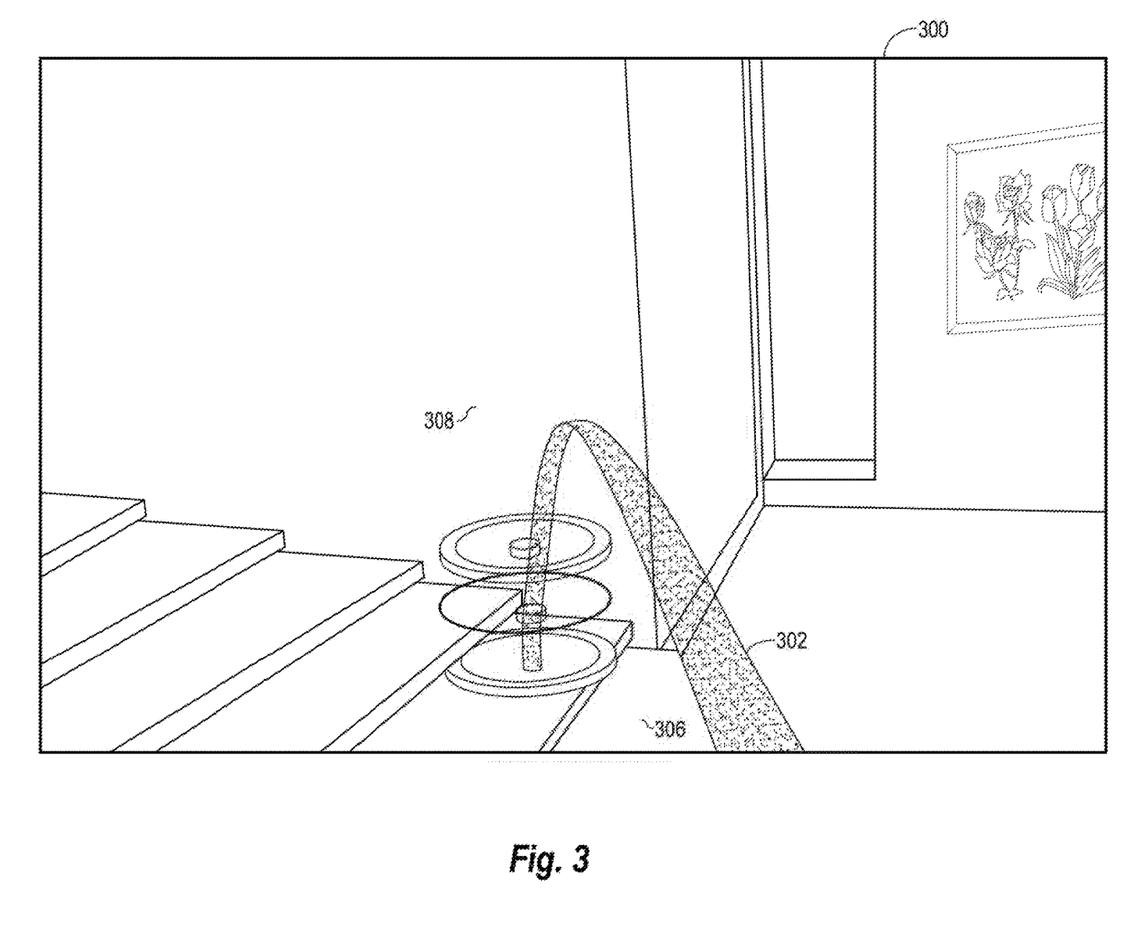
FIG. 3 illustrates additional examples of a ray casting virtual object selection system in a VR environment.

FIG. 3 illustrates a scene 300 rendered in a HMD in which a ray 302 is cast towards a virtual wall 308 in a VR environment. In the illustrated embodiment, the computer system 100 detects that the user's selection ray 302 is not directed towards an object of interest (i.e., the virtual wall 308). In response, the computer system 100 does not identify an optimal viewing position, but instead directs the user selection ray 302 to a location proximate to the virtual wall 308 on the virtual floor 306. This allows the user to VR teleport to that location if they desire (e.g., by activation of a user control).

In some embodiments, the ray 302 has properties that enables it to bounce off of the object (e.g., the virtual wall 308), terminating at a location on a virtual floor 306 or surface near the object. The trajectory of the ray 302 may follow a trajectory that a physical object (e.g., a ball) would take if it were to bounce off of the selected object. For instance, the trajectory would bounce off of the object (e.g., the virtual wall 308) and move downward to a ground/surface area (e.g., the virtual floor 306) near the object. The user is then teleported to that ground/surface area when the user selects that location (e.g., by releasing a control, selecting a control, or by providing any other selection input associated with the ray being cast).

In some instances, the computer system 100 detects contexts in which to refrain from repositioning a user at a selected location, based on determining the selected location is not an optimal viewing position. For example, some objects of interest are only optimally viewed from a single side, and the computer system 100 will refrain from repositioning the user on the wrong side of the object. For instance, in some disclosed embodiments, when a virtual object intended to be viewed from an optimal side is selected by a user-cast ray from a side opposite the optimal side, the computer system 100 refrains from identifying an optimal viewing position on the selected side and, instead, directs the ray to a location proximate to the virtual object on a more optimal viewing side. By way of example, in one instance, when a user casts a ray to select a VR viewing screen from a side opposite the intended viewing side of the VR screen, the computer system 100 directs the ray to the ground near the VR screen on the user's side (instead of identifying an optimal viewing position for the VR screen from the optimal side).

In yet other instances, the computer system 100 proceeds to identify an optimal viewing position for an object, even where a user selects the object from a side which is not optimal for viewing. The computer system 100 may be configured to proceed to identify an optimal viewing position based on the characteristics of the virtual object, artificial intelligence and/or machine learning (e.g., data indicating that a particular user, or users in general, typically VR teleport near an object and subsequently transition to an optimal viewing position for the object, etc.), as well as other predetermined or dynamically determined criteria. By way of non-limiting example, a computer system 100 may identify an optimal viewing position for a virtual object in response to a user ray-cast selecting the virtual object from the back of the virtual object. The computing system 100 may follow this course of action based, for example, on a predetermination that the computing system 100 will always identify an optimal viewing position for a virtual object regardless of where the user selects the virtual object from.

Furthermore, in some implementations, when a ray is cast to select a virtual object, the object becomes highlighted or otherwise altered in appearance in the HMD to indicate to the user that the object is presently selected.

Providing an Optimal Viewing Position for a Virtual Object

In response to detecting user selection of a virtual object or VR application in a VR environment (e.g., by a ray casted to select a virtual object), the computer system 100 identifies an optimal viewing position for the virtual object selected. The optimal viewing position is dynamically determined based on various criteria, described below.

Figure 4:
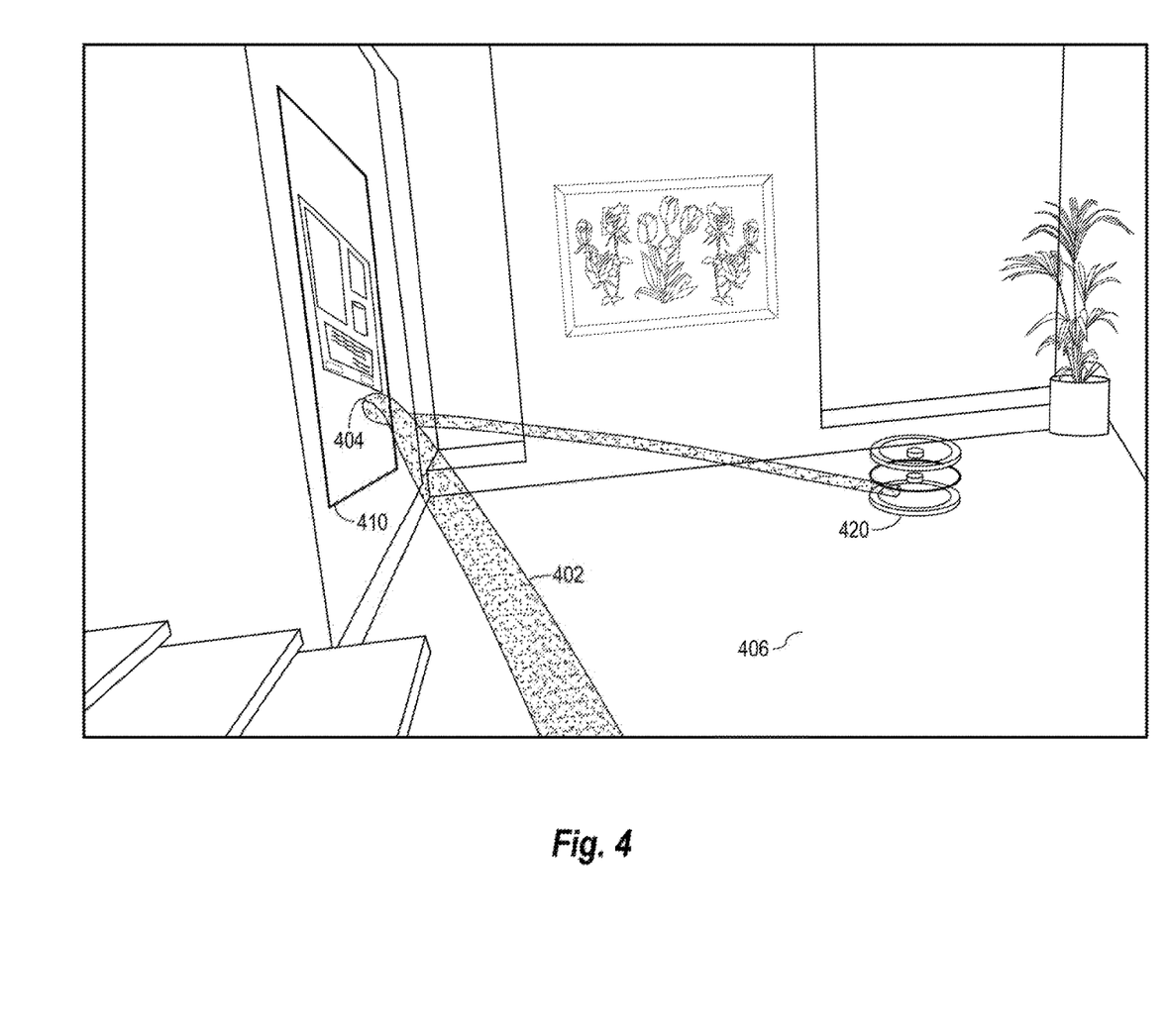
FIG. 4 illustrates an exemplary scenario in which a user selects a virtual object for viewing from an optimal viewing position and the computer system provides a dynamically determined optimal viewing position.

Some disclosed embodiments include an optimal viewing position which has an associated displacement from the virtual object to be viewed. In some embodiments, the optimal viewing position is calculated to be displaced from the selected virtual object by a distance that corresponds to the width of the virtual object. In FIG. 4, for example, a user casts a ray 402 at a VR screen 410, selecting the VR screen 410 for viewing from an optimal viewing position. The computer system 100 determines the width of the VR screen 410 and provides an optimal viewing position 420 that is displaced from the VR screen 410 by a distance that is substantially equal to the width of the VR screen 410. As illustrated, the location of the optimal viewing position 420 is displayed as an illuminated ring in the HMD, with the ray 402 being directed from the selection location 404 on the VR screen 410 towards the illuminated ring.

In some scenarios, the height of the virtual object to be viewed exceeds the width of the virtual object. Consequently, in some instances, if the computer system proceeds with the width-based displacement determination described above, the user's resultant optimal viewing position would not display the full height of the virtual object in the HMD. Therefore, in some embodiments, the optimal viewing position is calculated to be displaced from the selected virtual object by a distance that corresponds to the height of the virtual object. In one example, when a user casts a ray to select a tall window (i.e., a window that is taller than it is wide), the computer system 100 determines that the height of the window exceeds the width of the window and provides an optimal viewing position that is displaced from the window by a distance that is substantially equal to the height of the window.

The displacement of the optimal viewing position from the virtual object to be viewed is, in some instances, based on the height of the user and the height of the virtual object to be viewed. Some computer systems 100 include altimeters, gyroscopes, and/or other I/O interface(s) 130 for determining the height of the user (e.g., where the HMD is worn). In other computer systems 100, the height of the user is manually entered. In some disclosed embodiments, the computer system adjusts the displacement of the optimal viewing position from the virtual object according to the height of the user. For example, in FIG. 4, an optimal viewing position 420 determined by the width of the VR screen 410 is displayed. In response to determining that the height of the user is lower than a predetermined threshold (with respect to the height and/or altitude of the virtual object), the computer system 100 increases the displacement of the optimal viewing position 420 from the VR screen 410 (e.g., by an amount proportional to the difference between the height of the user and the predetermined threshold).

In yet other embodiments, the optimal viewing position is displaced from the virtual object such that the entire field of view ("FOV") of the HMD is encapsulated by the virtual object. For example, the computer system 100 may compare the aspect ratio of the HMD to an aspect ratio of the virtual object to be viewed. Based on this comparison, the computer system 100 may select an optimal viewing position with a displacement such that two opposing edges of the virtual object will be substantially aligned with (or inside of) opposing boundaries of the FOV of the HMD. This displacement may similarly be modified based on the height of the user and/or other considerations/parameters described herein.

In some embodiments, the optimal viewing position also has an associated altitude. In some instances, the computer system 100 preserves the height of the user with respect to the VR environment as the altitude of the optimal viewing position (e.g., the height of the user's field of vision off of the virtual terrain). For example, in one embodiment illustrated in FIG. 4, the optimal viewing position 420 is displaced from the virtual floor 406 by an altitude that corresponds to the height of the user with respect to the VR environment. Some disclosed embodiments include a configuration in which the computer system 100 matches the height of the user with the height of a desired focus point of the virtual object to be viewed (or another desired altitude).

In yet other embodiments disclosed herein, the optimal viewing position has an associated viewing orientation. For example, when the height of the user does not substantially equal the height of the center or other desired focus point of a virtual object, an altitudinal offset may occur between the user's FOV and the desired focus point of the virtual object. In some disclosed embodiments, an alteration in the orientation of the optimal viewing position is introduced to focus the attention of the user on the center or desired focus point of the virtual object. In one instance, upon detecting that the height of the user substantially differs from the height of the center or desired focus point of the virtual object, the computer system 100 alters the orientation (or tilts) the optimal viewing position so that the center of the resultant FOV of the user aligns with the center or desired focus point of the virtual object.

In at least some embodiments demonstrated in FIG. 4, when the user's height does not align with the vertical center (or other desired focus point) of the VR screen 410, the computer system 100 alters the orientation of the optimal viewing position 420 to focus the resultant FOV of the user on the desired focus point of the VR screen 410.

In another instance, the computer system 100 bases the alteration in orientation on the relative altitude of the user and a desired focus point of the virtual object. Some disclosed embodiments also base the alteration in the orientation of the optimal viewing position on VR environmental factors and/or characteristics of the virtual object to be viewed. For instance, where an object is optimally viewed from a virtual mountain, and the height of the mountain is substantially equal to the height of the desired focus point of the object, the computer makes no alteration in the orientation of the optimal viewing position.

In some instances, the optimal viewing position is based, at least in part, on the FOV of the HMD. HMDs exist with various FOVs. For example, some HMDs have a horizontal field of view between 96 degrees and 210 degrees. Some HMDs have a vertical field of view between 70 degrees and 180 degrees. In at least one disclosed embodiment, the computer system 100 detects the FOV of the user's HMD and alters the optimal viewing position based on the HMD FOV. For example, in one embodiment illustrated in FIG. 4, upon detecting that the user's HMD has a horizontal field of view of 96 degrees and a vertical field of view of 70 degrees, the computer system 100 increases the displacement of the optimal viewing position 420 from the virtual object to ensure that the optimal viewing position 420 fully captures the virtual object to be viewed (the VR screen 410).

In yet other instances, the computer system 100 provides an optimal viewing position that is based on a function including values representing motion characteristics of the virtual object (e.g., direction, velocity, acceleration).

For instance, in at least some embodiments, the optimal viewing position is determined based on the motion of the virtual object to be viewed. Upon user selection of a moving virtual object, for example, the computer system 100 detects motion characteristics (e.g., velocity, acceleration) of the virtual object to be viewed. In some instances, based on the detected motion characteristics, the computer system 100 provides an optimal viewing position with an increased displacement from the virtual object and/or an altered orientation. In one instance, the optimal viewing position is chosen to allow the user to continuously view the virtual object as the virtual object moves, as opposed to providing an optimal viewing position that only allows for momentary viewing of the virtual object (e.g., the virtual object moves out of the user's field of view soon after the user begins viewing the object from the optimal viewing position).

Figure 5A:
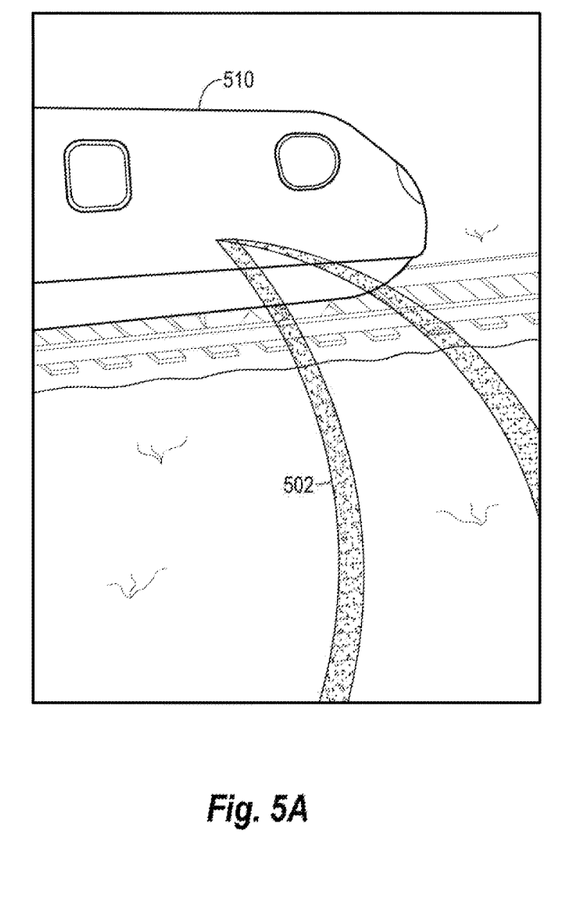
FIGS. 5A and 5B illustrate an example of a scenario in which the optimal viewing position provided by the computer system is based on motion characteristics of the virtual object to be viewed.
Figure 5B:
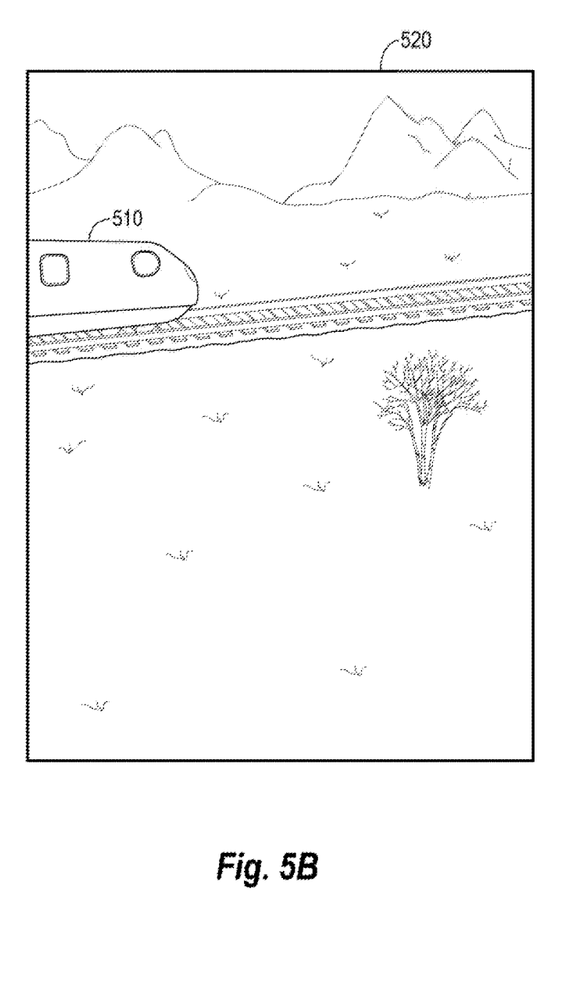

By way of non-limiting example, FIG. 5A illustrates a scenario in which a user casts a ray 502 to select a moving train 510. The computer system 100 detects motion characteristics of the train 510, and provides an optimal viewing position which is located far enough from the moving train 510 for the user to view the moving train for an extended duration (e.g., a viewing position that increases the time that the train will be in the user's field of view). FIG. 5B illustrates an exemplary scene 520 rendered in the HMD which displays the moving train 510 from an exemplary optimal viewing position.

Figure 6A:
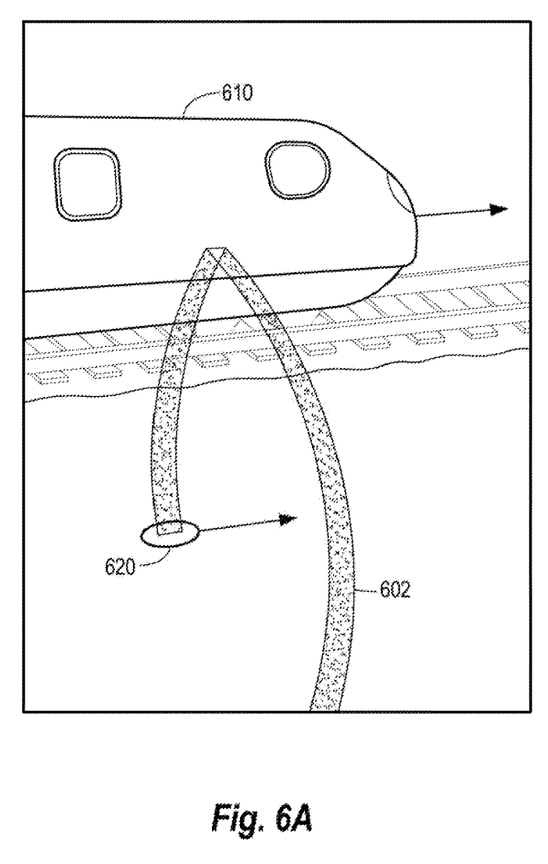
FIGS. 6A, 6B, and 6C illustrate an exemplary scenario in which the optimal viewing position provided by the computer system is tethered to a moving virtual object to be viewed.
Figure 6B:
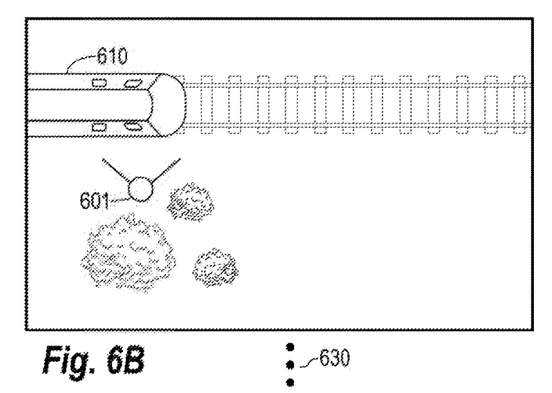
Figure 6C:
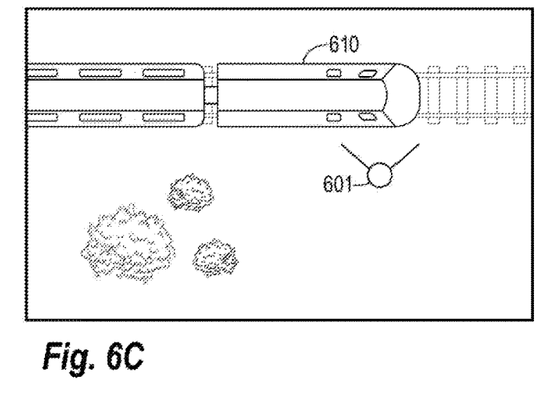

In other instances, upon detecting motion characteristics of the user-selected virtual object, the computer system 100 provides an optimal viewing position that is itself in motion (at a same relative distance from the selected object). By way of non-limiting example, in FIG. 6A the user casts a ray 602 and selects a virtual moving train 610 in a VR environment for viewing from an optimal viewing position. The computer system 100 provides an optimal viewing position which is tethered to the virtual spaceship (e.g., the optimal viewing position is itself moving with velocity, acceleration, and/or direction that correspond to the motion characteristics of the virtual spaceship). In such instances, the user's viewing perspective/position is tethered to the moving object and is dynamically updated as the object moves. As illustrated, the optimal viewing position 620 has a velocity that matches that of the moving train 610, as indicated by the velocity (V) vector illustration. FIGS. 6B and 6C illustrate a top view of the virtual environment in which the user 601 views the virtual moving train 610 from the optimal viewing position 620 provided by the computer system, which is tethered to the moving train 610. Ellipsis 630 indicate passage of time, and FIG. 6C demonstrates that at a time later than that shown in FIG. 6B, both the moving train 610 and the user 601 (i.e., the user perspective rendered on the HMD) have traveled in the direction of their velocity (although relative to one another they are in the same position). This functionality may allow for users to continuously view moving virtual objects from optimal viewing positions without the virtual objects escaping the user's field of view.

Some disclosed embodiments include a configuration in which the optimal viewing position is influenced by the location of a user selection indicator (e.g., a ray) on the selected virtual object. For instance, the displacement from the virtual object, the orientation, lateral offset, and/or the altitude of the provided optimal viewing position may depend on the location where the user's selection ray strikes the virtual object to be viewed.

Figure 7:
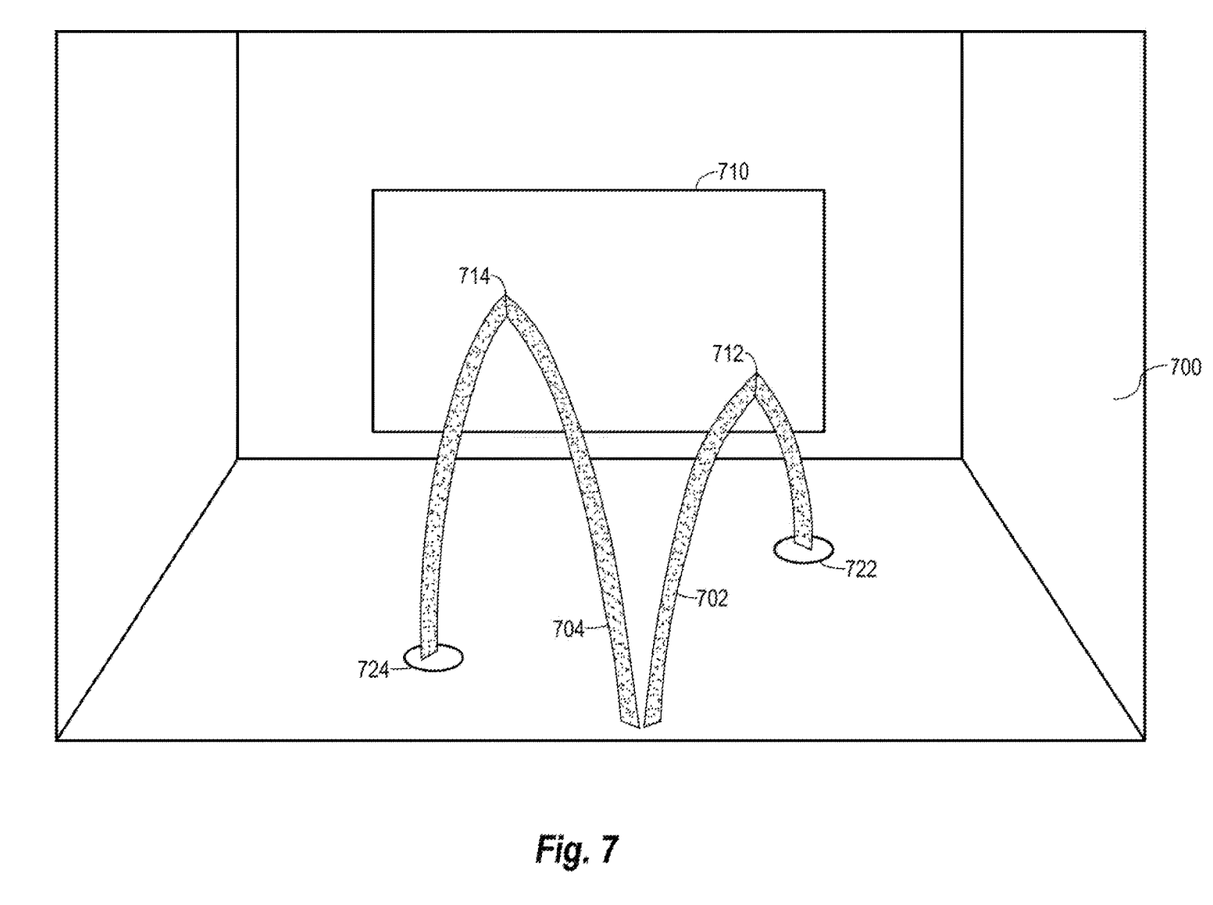
FIG. 7 illustrates an example of a scenario in which the optimal viewing position provided by the computer system is influenced by the location of a user selection indicator on the virtual object to be viewed.

To demonstrate an example of this functionality, FIG. 7 illustrates a virtual theatre room 700 with a virtual theatre screen 710. A first exemplary user selection ray 702 and a second exemplary user selection ray 704 are shown, with optimal viewing positions 722 and 724 corresponding to each respective user selection ray. The first user selection ray 702 strikes the virtual theatre screen 710 at a first selection point 712 in a lower-right portion of the screen 710. The computer system 100 detects the location where the user selection ray 702 strikes the virtual theatre screen (e.g., selection point 712) and decreases the displacement of the resultant optimal viewing position 722 from the screen by an amount corresponding to the location of the selection point 712 (e.g., the distance between selection point 712 and the bottom of the screen 710). The computer system 100, in some instances, also laterally offsets the optimal viewing position 722 from being aligned with the center of the theatre screen 710 by an amount that corresponds to the lateral distance between the selection point 712 and the center of the screen.

User selection ray 704, on the other hand, strikes the theatre screen at a second selection point 714 in a middle-left portion of the screen. Accordingly, the computer system 100 detects the location of the second selection point 714 and laterally offsets the optimal viewing position 724 from being aligned with the center of the theatre screen 710 by an amount that corresponds to the lateral distance between the location of the second selection point 714 and the center of the screen 710.

In other embodiments, irrespective of where the ray is directed on the theatre screen (or other object), the teleported/repositioned user perspective in the VR environment relative to the selected object will be the same (e.g., will not depend on the location of the user selection point). This location will be the 'optimal' location based on any of the factors described herein.

Once the computer system 100 has provided an optimal viewing position (e.g., based on characteristics of the virtual object, the user, the VR environment, and/or the HMD, and/or based on the manner of selection, etc.), some disclosed embodiments allow users to further adjust/tune the optimal viewing position. For example, returning to FIG. 4, in some embodiments, after the computer system provides and indicates an optimal viewing position 420, the user is able to adjust/tune the position of the optimal viewing position 420 from the virtual object (e.g., the VR screen 410) in any direction/orientation (e.g., the distance, altitude, orientation, lateral offset and/or the motion characteristics of the optimal viewing position (e.g., velocity, acceleration, and/or direction)). In some instances, the aforementioned adjustments are made with a user-operated control (e.g., a physical dial, button, joystick, and/or a control within an application run on the computer system 100). The user-operated control may also include gestures and/or sounds detected by sensor(s) 150 and/or sensor(s) 160 (e.g., eye movement/focus, hand gestures, vocal cues) to provide selection/tuning input.

In some instances, the user adjusts the optimal viewing position before transitioning the user's viewpoint to that of the optimal viewing position in the HMD. In other instances, the user repositions their viewpoint after transitioning the user's viewpoint to that of the optimal viewing position in the HMD.

Furthermore, in some disclosed embodiments, the optimal viewing position is based on metadata associated with the virtual object to be viewed. Additionally or alternatively, the optimal viewing position depends on artificial intelligence and/or machine learning pertaining to the virtual object to be viewed and/or the user(s). For instance, the computing system 100 is capable of adjusting the optimal viewing position for a virtual object based on positional adjustments previously made by one or more users. In one example, a particular user casts a ray to select a virtual object for viewing from an optimal viewing position. This particular user regularly views the virtual object at a distance that is closer to the virtual object than the distance that the computer system 100 would normally identify as the optimal viewing distance. For example, this particular user may regularly adjust the optimal viewing displacement from the virtual object before transitioning viewpoints to the provided optimal viewing position, and/or this particular user may regularly reposition their viewpoint to be closer to the object after transitioning viewpoints to the provided optimal viewing position. The computer system 100 detects (e.g., from data on local or network storage) that this particular user regularly views the virtual object from a closer distance. The computer system 100 then accordingly adjusts the optimal viewing position to comply with the user's apparent displacement preference with respect to the object.

In other instances, the computer system 100 makes adjustments to the altitude of the optimal viewing position, the orientation of the optimal viewing position, the lateral offset of the optimal viewing position, and/or the motion characteristics of the optimal viewing position (e.g., velocity, acceleration, and/or direction) based on data (e.g., form machine learning, artificial intelligence, and/or metadata) pertaining to user preferences. In yet other instances, the computer system 100 applies a user's preference vis-à-vis one or more virtual objects to other virtual objects (e.g., the computer system 100 provides closer optimal viewing positions to a user who regularly views most objects from a distance closer than the computer system 100 would normally provide).

In some disclosed embodiments, the optimal viewing position(s) provided by the computer system 100 are altered based on aggregate preferences (e.g., the preferred viewing distance of a group of users). For instance, where most users view a particular virtual object at a viewing orientation that differs from the viewing orientation ordinarily associated with the optimal viewing position, the computer system 100 detects the aggregate user preference (e.g., from data on local or network storage) and alters the viewing orientation to comply with the aggregate preference.

In some disclosed embodiments, the optimal viewing position(s) provided by the computer system 100 are altered based on contextual information in the VR environment and/or device performance. For instance, lighting that is intentionally provided in the VR environment and/or that is caused by power settings of the VR device may be suboptimal for viewing certain objects, particularly from certain angles and/or distances. In these instances, due to detected ambient lighting conditions in the VR environment, the optimal position may be adjusted (e.g., narrowed) to bring the user in closer visual proximity to the target object(s), such that the target object(s) can be seen more easily. Other VR environmental conditions may also be used to alter the optimal viewing position (e.g., VR weather conditions like rain or fog, light effects, visual noise, etc.).

It will be appreciated that the optimal viewing position may be determined by one or any combination of the foregoing criteria (e.g., the characteristics of the virtual object, the user, the VR environment, the HMD, the manner of user selection, artificial intelligence, machine learning, and/or metadata). Furthermore, any or all of the foregoing criteria may mutually depend on one another (e.g., alteration in orientation of the optimal viewing position may depend on the displacement of the optimal viewing position from the virtual object).

Once the computer system provides an optimal viewing position, in some embodiments, the user initiates a triggering event to initiate rendering of a scene in the HMD which is arranged to display the virtual object from the optimal viewing position and VR perspective. In some instances, this functionality is similar to VR teleportation (e.g., moving the user's virtual viewpoint to the optimal viewing position). In other instances, this functionality includes rendering a virtual representation of the virtual object over the scene already displayed in the user's HMD (e.g., similar to VR teleporting the virtual object into the FOV of the user for optimal viewing). The triggering event may be, but is not limited to, activation of a control within an application run on the computer system 100, activation of a physical control on the computer system 100 (e.g., on an I/O interface 130), expiration of a predetermined time period after selecting a virtual object, detection of acoustic signals, and/or detection of gestures (e.g., on a sensor 150/160).

The functionalities described hereinabove allow for dynamic identification of an optimal viewing position for viewing of a virtual object or VR application in a VR environment. This allows a computer system to provide users with optimal viewing conditions even for objects that are not hard-coded into the VR environment (e.g., in a VR sandbox scenario, objects that are custom created by users) and for situations where the characteristics of the object(s) to be views has been changed or (e.g., in VR scenarios where users are able to manipulate virtual objects).

User Group Embodiments

Many VR systems allow for several users to collaborate in a single VR environment (e.g., over a network). By way of non-limiting example, a VR environment could include a virtual museum, with a user acting as a tour guide and other users acting as patrons. Accordingly, at least some embodiments disclosed herein are optimized for group scenarios. In some instances, one user in a defined group selects a virtual object for viewing from an optimal viewing position (e.g., a virtual tour guide selecting an object for at least a subset of the group to view). In response to this selection, in some embodiments, the computer system 100 determines optimal viewing position(s) for the members of the group. In addition to the criteria already discussed (e.g., the characteristics of the virtual object, the user, the VR environment, the HMD, the manner of user selection, artificial intelligence, machine learning, and/or metadata) the computer system 100 may use additional and/or alternative criteria in providing the optimal viewing position(s), described below.

In some instances, the computer system 100 identifies a single optimal viewing position for all members of the group. For example, after a virtual tour guide selects a virtual object to be viewed from an optimal viewing position and initiates scene transitioning, the scene (displaying the virtual object from the optimal viewing position) rendered in each user's HMD is the same (e.g., as if each of the group members were standing in exactly the same spot). To provide a realistic viewing experience, the computer system 100, in some embodiments, places virtual representations of other group members around the resultant viewing location of each group member, such that if a group member were to look around, they would see other group members standing around them.

In some instances, the users in a group have different viewing preferences and/or parameters with respect to the virtual object to be viewed from an optimal viewing position (e.g., data indicates that different group members regularly make different alterations to the normally provided optimal viewing position for a particular virtual object). Furthermore, in some instances, different users have different heights, HMD FOVs, or other characteristics pertinent to the optimal viewing position. When a single optimal viewing position is to be provided to all users in a group, in some embodiments, the computer system 100 averages the optimal viewing positions of all users in the group when identifying the optimal viewing position for the entire group. The resultant average optimal viewing position defines the scene that will be displayed in each user's HMD upon initiation of scene transitioning. In other embodiments, the computer system uses only the optimal viewing position of only a single member of the group (e.g., a virtual tour guide or other designated leader), rather than an average of all group members, when identifying the optimal viewing position for the entire group.

In other instances, the computer system 100 identifies a plurality of optimal viewing positions for the members of the group. In some embodiments, the computer system 100 identifies an optimal viewing position that is personal to each member of the group (e.g., one optimal viewing position for each member of the group). In such situations, the computer system 100 may apply each user's viewing preference to each respective user when identifying optimal viewing positions for each user. Similarly, the computer system 100 may base each user's optimal viewing position on each user's respective height, or other characteristics pertinent to the optimal viewing position (e.g., the FOV of each user's HMD).

In at least some disclosed embodiments, the computer system ensures that each user will have an unobstructed view of the selected virtual object. In some instances, this includes refraining from rendering virtual representations of group members whose optimal viewing position stands between one or more users and the virtual object to be viewed.

In some VR scenarios, it is desirable to give users a sense of realism that precludes no-collide functionality with respect to other users (e.g., users cannot pass through one another). In such instances, some embodiments include a configuration in which the computer system 100 identifies a plurality of optimal viewing positions (e.g., based on preferences and characteristics of one or more group members) that do not overlap with one another (e.g., users standing in the optimal viewing positions would not collide with one another). Consequently, in some instances, the computer system 100 sequentially orders and assigns the optimal viewing positions (e.g., a first best viewing position, a second best viewing position, a third best viewing position, etc.) to a group of users when there are designated viewing positions in the VR environment. To ensure a minimally unobstructed view of the virtual object for each user, in some embodiments, the computer system 100 assigns users to the ordered viewing positions according to the characteristics of the users in the group, such as user height (e.g., shorter users are placed in the front-most viewing positions).

In other embodiments, the no-collide functionality is provided for each user, while assigning each user of a group the exact same optimal viewing position relative to an object. The plurality of users will then view the object(s) from the same location, without being aware that they are sharing the same position. To help accommodate realism of being in a group setting, the different group members can be presented with displays of the other group members around them at different positions in the VR environment, even though they are sharing the same viewing perspective for a particular object.

Exemplary Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed. These methods are implemented by one or more processors of a computer system (e.g., the computer system 100 of FIG. 1). By way of example, a computer system includes one or more computer-readable hardware storage media that store computer-executable code. This computer-executable code is executable by the one or more processors to cause the computer system to perform these methods.

Figure 8:
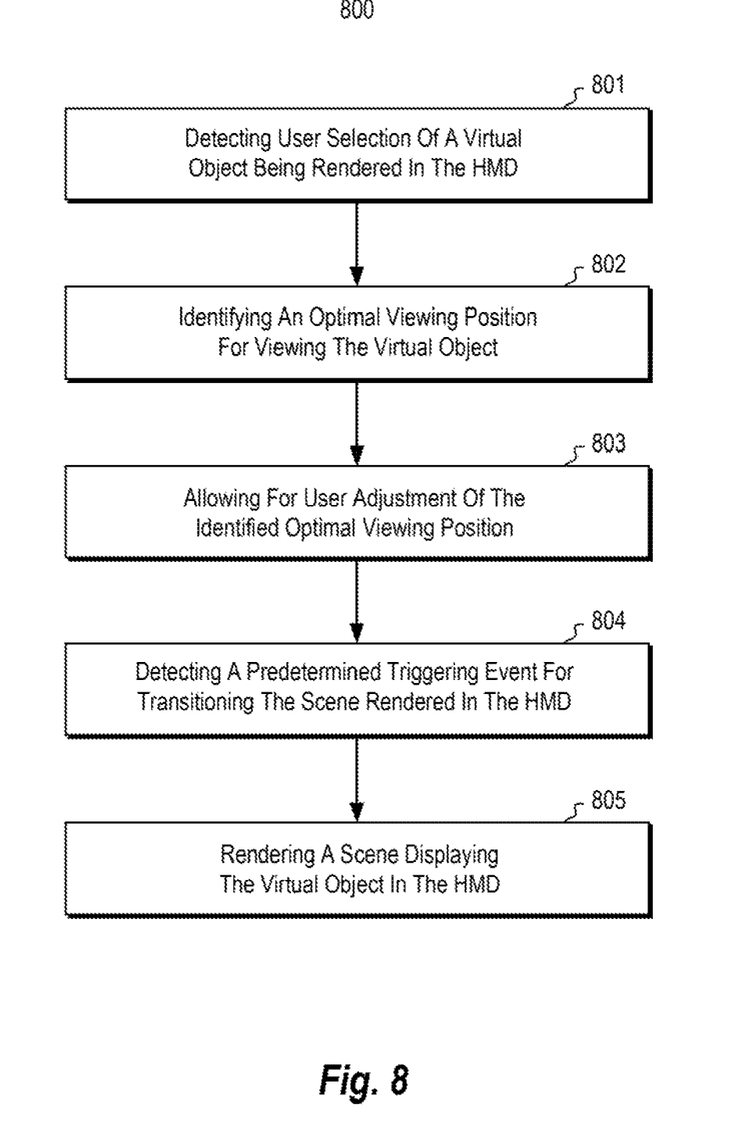
FIG. 8 illustrates a flow diagram for an exemplary method for providing an optimal viewing position for viewing a virtual object in a VR environment.

FIG. 8 illustrates a flowchart 800 of exemplary methods for transitioning displayed virtual reality scenes that are rendered in a HMD to display a virtual object form an optimal viewing position.

As shown, the method(s) include: an act of detecting user selection of a virtual object being rendered in the HMD (act 801). The selection may be performed by I/O interface(s) 130 and/or sensor(s) 150/160 (e.g., activation of a physical control or detection of eye movement/focus) or by other systems (e.g., activation of a user control within an application run on the computer system 100). The selection by a user may be implemented as a ray cast towards a virtual object being rendered in the HMD.

An optimal viewing position for viewing the virtual object is identified (act 802). In various disclosed embodiments, the computer system 100 determines the optimal viewing position based any combination of: the position of the virtual object, the width of the virtual object, the height of the virtual object, motion characteristics (e.g., velocity, acceleration) of the virtual object, the height of the user, the FOV of the HMD, characteristics of the VR environment, the location of a selection indicator on the virtual object, metadata, data pertaining to user viewpoint preferences, and/or group considerations.

Subsequently, user adjustment of the identified optimal viewing position is allowed (act 803). In some embodiments, the user is allowed to adjust the displacement of the optimal viewing position from the virtual object, the altitude of the optimal viewing position, the orientation of the optimal viewing position, the lateral offset of the optimal viewing position, and/or the motion characteristics of the optimal viewing position (e.g., velocity, acceleration, and/or direction). In at least some instances, the aforementioned adjustments are made with a user-operated control (e.g., a physical dial, button, joystick, and/or a control within an application run on the computer system 100). The user-operated control may also include gestures and/or sounds detected by sensor(s) 150 and/or sensor(s) 160 (e.g., eye movement/focus, hand gestures, vocal cues).

Next, a predetermined triggering event for transitioning the scene rendered in the HMD is detected (act 804). The triggering event may be, but is not limited to, activation of a control within an application run on the computer system 100, activation of a physical control on the computer system 100 (e.g., on an I/O interface 130), expiration of a predetermined time period after selecting a virtual object, detection of acoustic signals, and/or detection of gestures (e.g., on a sensor 150/160).

Subsequent to detecting the predetermined triggering event, a scene displaying the virtual object from the viewpoint of the optimal viewing position is rendered in the HMD (act 805). In some instances, this step is similar to VR teleportation (e.g., moving the user's virtual viewpoint to the optimal viewing position). In other instances, this step includes rendering a virtual representation of the virtual object over the scene already displayed in the user's HMD (e.g., similar to VR teleporting the virtual object into the FOV of the user for optimal viewpoint).

While the foregoing embodiments are primarily described as applying to configurations in which a user selection ray is utilized to select virtual objects for viewing from an optimal viewing position, any selection indicator could be utilized with the embodiments described herein (e.g., a pointer rendered in the HMD).

Furthermore, while many of the foregoing embodiments are primarily described as applying to scenarios where a single optimal viewing position for a virtual object is identified, those skilled in the art will recognize that the embodiments described herein can be applied to and do apply to scenarios where multiple optimal viewing positions are identified for a single virtual object. For example, in some instances, a user may be allowed to select between multiple optimal viewing positions provided by the computer system 100.

It will also be appreciated that, while the disclosed embodiments are particularly suitable for VR scenarios, the disclosed embodiments can also be applied and used in augmented reality (AR) scenarios, where the rendered VR scene or VR image is an AR scene or AR image that is rendered on an AR HMD. Accordingly, in such embodiments all of the recited VR components are replaced by corresponding AR components.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
    one or more processor(s); and
    one or more computer-readable hardware storage media having stored thereon computer-executable instructions that are executable by the one or more processor(s) to cause the computer system to:
        detect a selection of a virtual object being rendered in a head mounted display (HMD), wherein a virtual selection ray, which is provided to select the virtual object and which is also rendered in the HMD, is used to perform the selection of the virtual object;
        identify an optimal viewing position of the virtual object, the optimal viewing position being dynamically calculated based on one or more characteristic(s) of the virtual object;
        subsequent to the virtual selection ray being visualized as being cast towards the virtual object and subsequent to the optimal viewing position being identified, cause the virtual selection ray to be automatically directed to a new location that is different from a location where the virtual selection ray landed after being cast, the new location corresponding to the optimal viewing position; and
        in response to detecting a predetermined triggering event, render a scene in the HMD, the scene being arranged to display the virtual object from the new location of the virtual selection ray so as to display the virtual object from the optimal viewing position.

2. The computer system of claim 1, wherein the optimal viewing position is calculated to be displaced from the virtual object by a distance that corresponds to a width of the virtual object.

3. The computer system of claim 1, wherein the optimal viewing position is calculated to be based on a function including values representing motion characteristics of the virtual object.

4. The computer system of claim 1, wherein the optimal viewing position includes a relative altitude corresponding to a height of the virtual object and that is based on a height of a user.

5. The computer system of claim 1, wherein the selection includes an associated selection location, and the optimal viewing position being calculated to be further based on the associated selection location.

6. The computer system of claim 1, wherein the optimal viewing position is calculated to be based at least in part on a field of view (FOV) of the HMD.

7. The computer system of claim 1, wherein execution of the computer-executable instructions further causes the computer system to:
    allow for adjustment of the identified optimal viewing position before rendering the scene that displays the virtual object from the optimal viewing position in the HMD.

8. The computer system of claim 1, wherein the optimal viewing position is further based on a function including values representing one or more positional adjustment(s) previously made to the optimal viewing position, the one or more positional adjustment(s) being stored in metadata of the virtual object.

9. The computer system of claim 1, wherein execution of the computer-executable instructions further causes the computer system to:
    identify a plurality of optimal viewing positions; and
    allow for selection of one of the plurality of optimal viewing positions before rendering the scene that displays the virtual object from the optimal viewing position in the HMD.

10. A method for transitioning viewing perspectives for virtual reality scenes rendered with a head mounted display (HMD), the method comprising:
    detecting a selection of a virtual object being rendered in the HMD, wherein a virtual selection ray, which is provided to select the virtual object and which is also rendered in the HMD, is used to perform the selection of the virtual object;
    identifying an optimal viewing position of the virtual object, the optimal viewing position being dynamically calculated based on one or more characteristic(s) of the virtual object;
    subsequent to the virtual selection ray being visualized as being cast towards the virtual object and subsequent to the optimal viewing position being identified, causing the virtual selection ray to be automatically directed to a new location that is different from a location where the virtual selection ray landed after being cast, the new location corresponding to the optimal viewing position; and in response to detecting a predetermined triggering event, rendering a scene in the HMD, the scene being arranged to display the virtual object from the new location of the virtual selection ray so as to display the virtual object from the optimal viewing position.

11. The method of claim 10, wherein the optimal viewing position is calculated to be displaced from the virtual object by a distance that corresponds to a width of the virtual object.

12. The method of claim 10, wherein the optimal viewing position is calculated to be based on a function including values representing motion characteristics of the virtual object.

13. The method of claim 10, wherein the selection includes an associated selection location, and the optimal viewing position being calculated to be further based on the associated selection location.

14. The method of claim 10, further comprising:
allowing for adjustment of the identified optimal viewing position before rendering the scene that displays the virtual object from the optimal viewing position in the HMD.

15. The method of claim 10, wherein the optimal viewing position is further based on a function including values representing one or more positional adjustment(s) previously made to the optimal viewing position, the one or more positional adjustment(s) being stored in metadata of the virtual object.

16. One or more hardware storage device(s) having stored thereon computer-executable instructions that are executable by one or more processor(s) of a computer system to cause the computer system to:
detect a selection by a user of a virtual object being rendered in a head mounted display (HMD), wherein a virtual selection ray, which is provided to the user to select the virtual object and which is also rendered in the HMD, is used to perform the selection of the virtual object;
identify an optimal viewing position of the virtual object, the optimal viewing position being dynamically calculated based on one or more characteristic(s) of the virtual object;
subsequent to the virtual selection ray being visualized as being cast towards the virtual object and subsequent to the optimal viewing position being identified, cause the virtual selection ray to be automatically directed to a new location that is different from a location where the virtual selection ray landed after being cast, the new location corresponding to the optimal viewing position; and
in response to detecting a predetermined triggering event, render a scene in the HMD, the scene being arranged to display the virtual object from the new location of the virtual selection ray so as to display the virtual object from the optimal viewing position.

17. The one or more hardware storage device(s) of claim 16, wherein the optimal viewing position is calculated to be displaced from the virtual object by a distance that corresponds to a width of the virtual object.

18. The one or more hardware storage device(s) of claim 16, wherein the optimal viewing position is calculated to be based on a function including values representing motion characteristics of the virtual object.

19. The one or more hardware storage device(s) of claim 16, wherein execution of the computer-executable instructions further causes the computer system to:
allow for user adjustment of the identified optimal viewing position before rendering the scene that displays the virtual object from the optimal viewing position in the HMD.

20. The one or more hardware storage device(s) of claim 16, wherein the optimal viewing position is further based on a function including values representing one or more positional adjustment(s) previously made by at least one user to the optimal viewing position, the one or more positional adjustment(s) being stored in metadata of the virtual object.

* * * * *